UNITED STATES PATENT OFFICE.

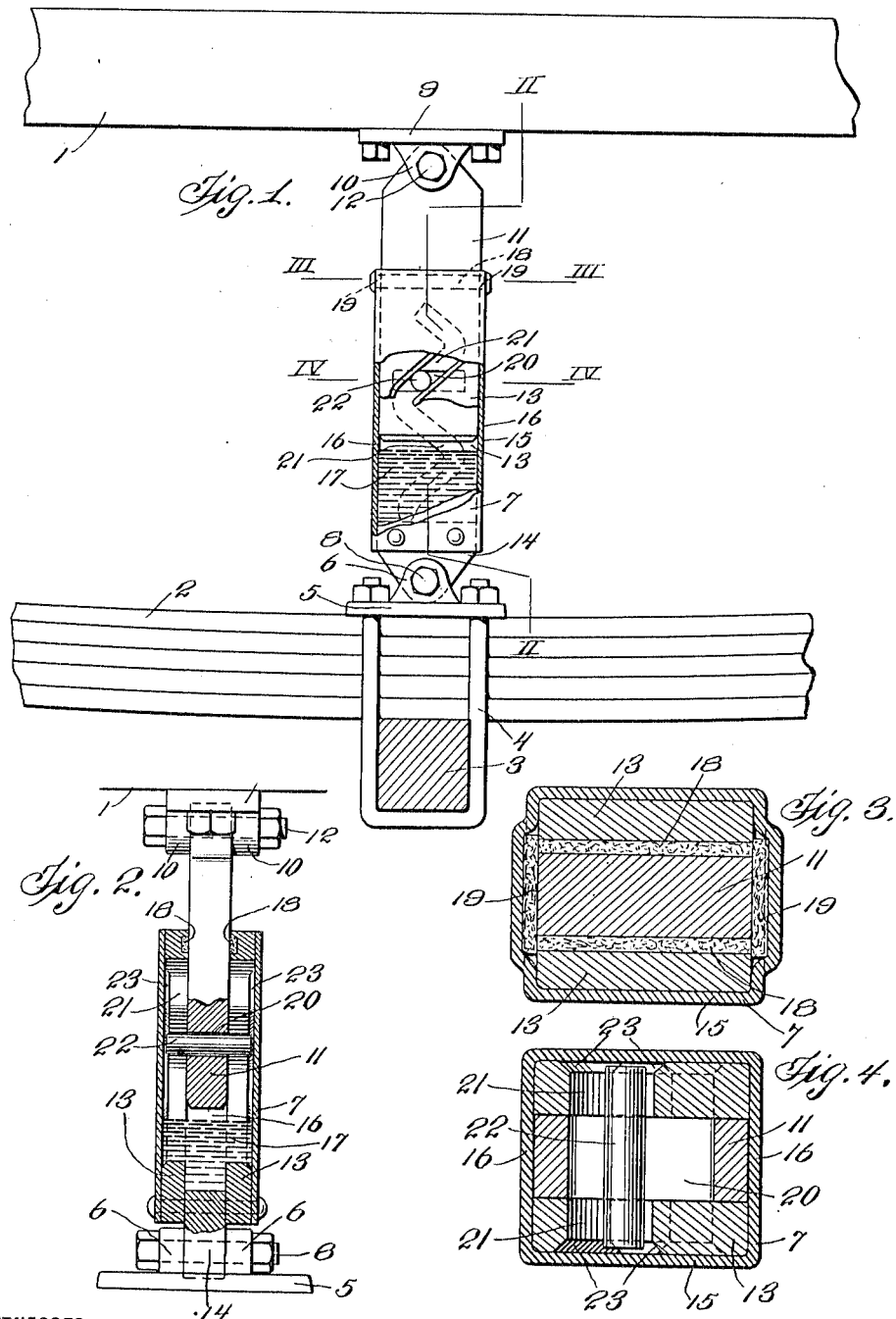

JOHN L. LAWRENCE, OF LAWRENCE, NEW YORK.

SHOCK-ABSORBER.

1,081,970.  Specification of Letters Patent.  Patented Dec. 23, 1913.

Application filed February 28, 1912. Serial No. 680,423.

*To all whom it may concern:*

Be it known that I, JOHN L. LAWRENCE, a citizen of the United States, and a resident of Lawrence, Long Island, county of Nassau, and State of New York, have invented certain new and useful Improvements in Shock-Absorbers, set forth in the following specification.

This invention relates to a shock absorbing device for retarding and preventing the too sudden compression and recoil of a spring, such as is comprised in the running gear of a vehicle or in a recoil carriage.

The device is applicable to a wide range of uses, but is particularly designed for use upon automobiles and similar vehicles the supporting springs of which are frequently subject to sudden and severe compression and distention, which result not only in possible damage to the spring structure but in a heavy and unpleasant jolting or bouncing of the chassis and consequently of the passengers carried in the vehicle.

This invention is designed so as not to interfere with the normal movement of the spring but is arranged to prevent the too sudden and severe movement.

A further object is to provide a structure of this class which is simple, practicable, of few and substantial parts; which may be manufactured at small cost; and which may be easily installed.

The above and further objects of the invention are set forth in the following claims. These claims should be read in connection with this specification which has reference to illustrative embodiments of the invention, shown in the accompanying drawings, which form a part of this application, and in which—

Figure 1 is an elevational view showing the device applied between the running gear and chassis of a vehicle, parts being broken away and shown in section for better disclosing the interior structure; Fig. 2 is a transverse vertical sectional view taken substantially on the plane of line II—II of Fig. 1; Fig. 3 is a transverse horizontal sectional view on the plane of line III—III of Fig. 1; and Fig. 4 is a similar section taken on the plane of line IV—IV of Fig. 1.

Referring to the drawings by reference numerals 1 indicates a portion of the chassis of the vehicle and 2 the adjacent underlying portion of the usual elliptical spring.

3 indicates the axle upon which the spring 2 is supported. The spring 2 is fixed to the axle 3 by the usual yoke member 4 and the upper plate as 5 of said member is preferably formed with ears 6 between which is pivotally mounted the lower portion 7 of the device, as upon the pin or bolt 8. Fixed to the under surface of the chassis 1 is a plate 9 formed with ears 10 between which is pivotally mounted the upper member 11 of the device, as upon pin or bolt 12. These mountings and the method of fixing the same to the running gear and chassis form no particular part of this invention, their sole function being to provide a convenient pivotal support for the two main elements 7 and 11 of the structure.

The main elements of the structure comprise members adapted to slide past one another each of the members being provided with a slot. A coöperating pin or bar engages these slots to retard the relative movement of the members by friction and by the inertia resistance of the pin which must be bodily moved. These members may comprise any suitable form. The embodiment illustrated comprises parts described as follows: The lower member 7 comprises a pair of parallelly disposed rectangular plates 13 spaced apart and connected at their bottom ends by an integrally, or separately formed block 14 which extends preferably below the bottom ends of the plates 13 and has pivotal connection with the bolt 8. A casing 15 entirely surrounds the plates 13 so as to retain said plates in fixed spaced relation and to close the otherwise open space between the edges of said plates as at 16. This casing forms a rectangular receptacle within the lower portion of which may be retained a quantity of lubricant as 17. The upper member 11 of the device comprises a rectangular plate of substantially the same length as the plates 13, and of a cross sectional area to fit snugly between the inner surfaces of the plates 13 and between the inner surfaces of the portions 16 of the casing 15. The lower end of the member 11 is normally spaced above the upper surface of the spacing block 14 a distance substantially the same as the space between the upper end of the member 7 and the ears 10, so as to permit the unobstructed telescopic movement of the members. Adjacent the upper edges of the plates 13 the same are formed with transversely extending grooves in their inner faces within which are fitted packing members 18 which bear upon the opposite side faces of the member 11. In the same plane with the packings 18, the upper ends of the portions 16 of the casing 15 are recessed and fitted with packing members 19 adapted to bear against the opposite edge faces of the member 11. These packings 18 and 19 effectually prevent the escape of the lubricant 17 from within the casing. At a point spaced from the lower end of the member 11 the same is provided with a transversely extending slot or guideway 20 extending entirely through the material of said member. Each of the plates 13 is formed with a slot or guideway 21 preferably, though not necessarily formed entirely through the material of said plate. The slots or guideways 21 extend in parallel planes and are inclined relative to the slot 20, and a pin or bar 22 extends through the slot 20 and has its opposite ends projecting into the slots 21. Obviously, the guideways 21 may comprise each only a straight slot inclined to the desired degree, if desired, but, for the sake of compactness and neatness in the structure, it is deemed preferable to employ a succession of slots arranged in the zig-zag fashion shown. The zig-zag slots also increase the inertia-resistance of the bodily moving pin by alternately moving it bringing it to rest and moving it again in a lateral direction. The slot 20 is of a length so that its opposite end walls coincide substantially with the vertical planes of the outer walls of the bends or ends of the slots 21 so that the bar 22 may have unobstructed movement along the slot 21.

In the operation of the structure illustrated the relative movement of the chassis 1 and spring member 2 produces a telescoping movement of the member 11 into the member 7. As the lower end of the member 11 plunges into the lubricant 17 the displaced lubricant is forced upwardly along the slots 21 and into the slot 20, for lubricating said slots, for lubricating the bar 22, and also for lubricating the juxtaposed engaging vertical faces of the parts. In order that the lubricant may find a ready passage around the bar 22 the outer corners of the slots 21 are cut away as at 23.

What is claimed and what is desired to be secured by United States Letters Patent is:—

1. A shock absorber comprising a casing; a plunger movable within said casing, said casing and said plunger being formed with guideways; and independent means bodily movable along said guideways for retarding the movements of said plunger.

2. A shock absorber comprising a casing; a plunger movable relative to said casing; one of said members being formed with a guideway; and means movable transversely of the other of said members adapted to engage said guideway for retarding the movements of said plunger.

3. A shock absorber comprising relatively movable members, one of said members having a guideway formed therein and another of said members having a relatively inclined guideway formed therein; and independent means bodily movable along said guideways for retarding the relative movements of said members.

4. A shock absorber comprising relatively movable members, one of said members having a guideway formed therein and another of said members having a relatively inclined guideway formed therein; and a single independently formed member bodily movable along said guideways adapted to engage said guideway for retarding the relative movements of said members.

5. In a shock absorber, the combination comprising substantially telescoping members, and means movable with one of said members adapted to move bodily transversely thereof and having frictional engagement with the other of said members for retarding the relative telescopic movement of said members.

6. A shock absorber comprising a pair of relatively movable members, one of said members having a guideway formed therein and the other of said members having a guideway disposed at an incline relative to said first guideway; and means extending through the guideway of one of said members engaging the guideway of the other of said members for retarding the movements of said members.

7. A shock absorber comprising a pair of relatively movable members, one of said members having a guideway formed therein and the other of said members having a pair of relatively inclined guideways; and means extending through said first mentioned guideway engaging said last mentioned guideways for retarding the movements of said members.

8. A shock absorber comprising a pair of relatively movable slotted members, the slot of one of said members being zig-zagged relative to the slot of the other of said members, and means engaging in said slots for retarding the movements of said members.

9. A shock absorber, comprising a pair of relatively movable rectangular plates having juxtaposed flat faces, one of said plates having a substantially transverse guideway and the other of said plates having a substantially longitudinal guideway arranged at an incline relative to said first guideway; and means engaging in said guideways for retarding the relative movements of said plates.

10. A shock absorber, comprising a pair of relatively movable rectangular plates having juxtaposed flat faces, each of said plates being formed with a guideway; and independent means bodily movable in said
5 guideways for retarding the relative movement of said plates.

In witness whereof I have signed my name to this specification in the presence of two subscribing witnesses.

JOHN L. LAWRENCE.

Witnesses:
LEONARD DAY,
L. GERSFORD HANDY.